Figure 1:
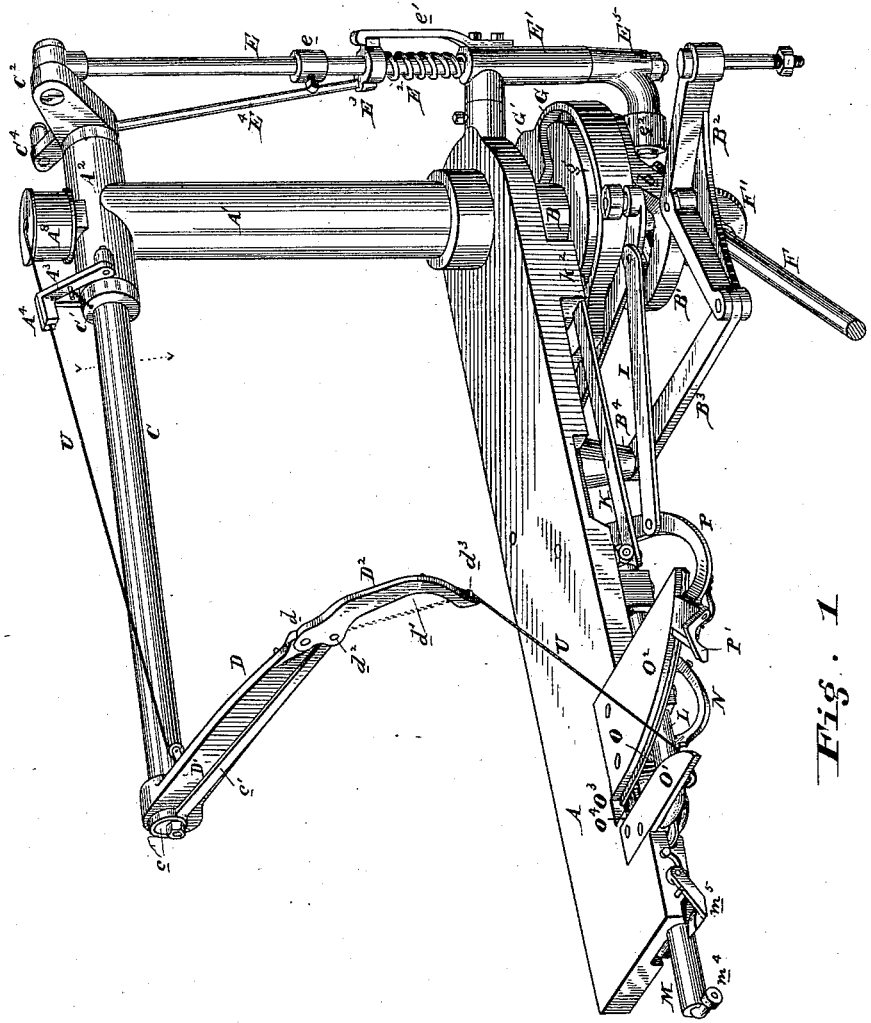

(No Model.) 6 Sheets—Sheet 1.
R. M. HUNTER.
GRAIN BINDER.

No. 273,089. Patented Feb. 27, 1883.

Attests
Inventor
Rudolph M. Hunter

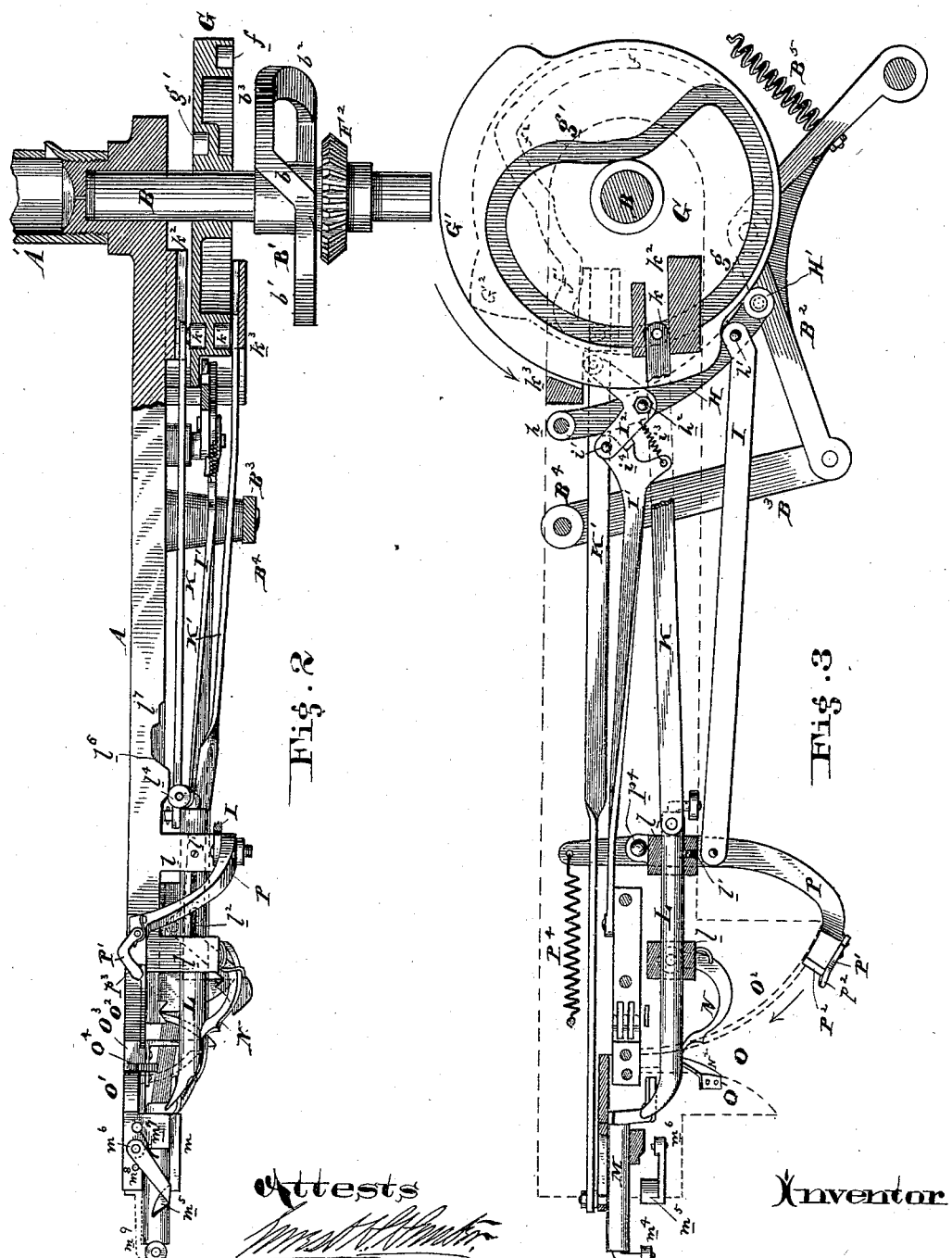

(No Model.)
R. M. HUNTER.
GRAIN BINDER.
No. 273,089. Patented Feb. 27, 1883.
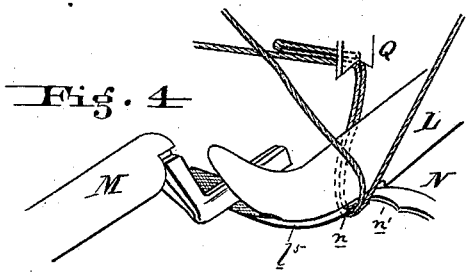
Fig. 4
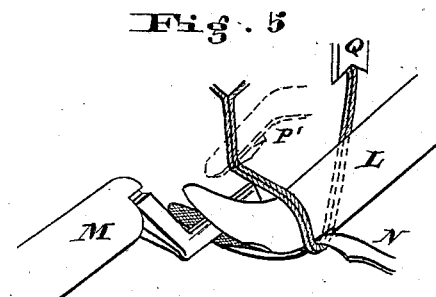
Fig. 5
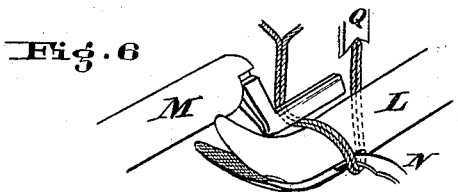
Fig. 6
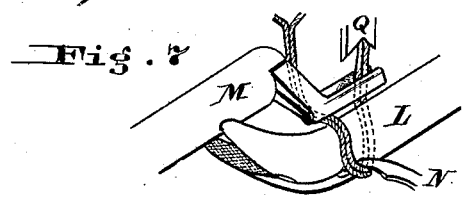
Fig. 7
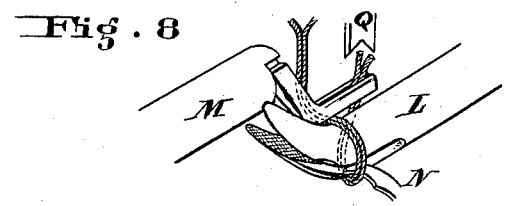
Fig. 8
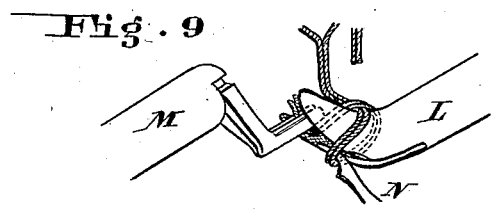
Fig. 9
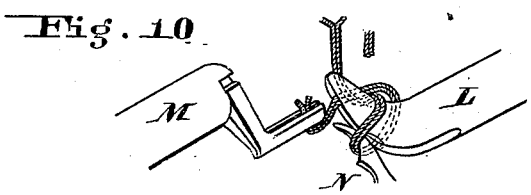
Fig. 10
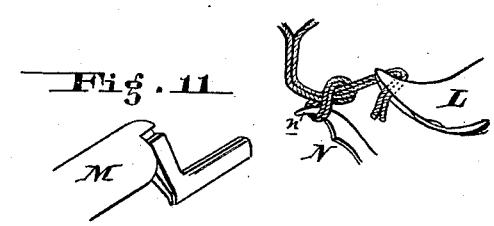
Fig. 11
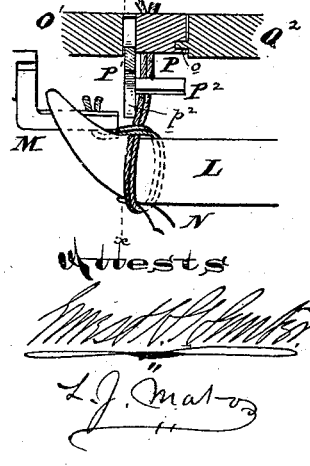
Fig. 13
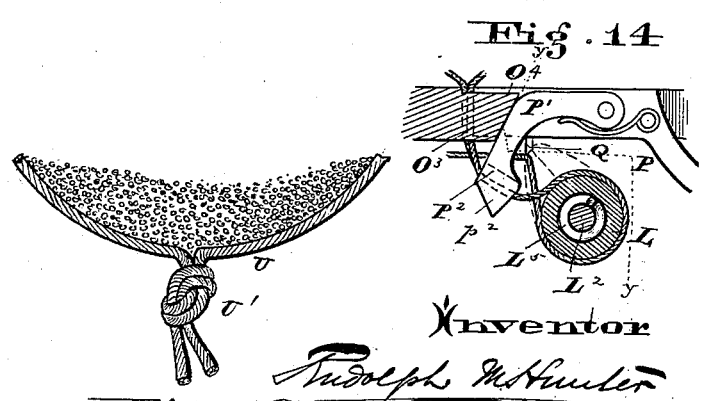
Fig. 14
Fig. 12
Witnesses
Inventor
Rudolph M. Hunter (No Model.) 6 Sheets—Sheet 4.

R. M. HUNTER.
GRAIN BINDER.

No. 273,089. Patented Feb. 27, 1883.

Attests
L. J. Matz
R. S. Cheap

Inventor
Rudolph M. Hunter (No Model.) 6 Sheets—Sheet 5.
R. M. HUNTER.
GRAIN BINDER.

No. 273,089. Patented Feb. 27, 1883.

Attests:
L. J. Matiny
R. T. Chiesf.

Inventor
Rudolph M. Hunter (No Model.)  6 Sheets—Sheet 6.

R. M. HUNTER.
GRAIN BINDER.

No. 273,089.  Patented Feb. 27, 1883.

UNITED STATES PATENT OFFICE.

RUDOLPH M. HUNTER, OF PHILADELPHIA, PENNSYLVANIA.

GRAIN-BINDER.

SPECIFICATION forming part of Letters Patent No. 273,089, dated February 27, 1883.

Application filed May 29, 1882. (No model.)

*To all whom it may concern:*

Be it known that I, RUDOLPH M. HUNTER, of the city and county of Philadelphia, and State of Pennsylvania, have invented new and useful Improvements in Grain-Binders, of which the following is a specification, reference being had to the accompanying drawings, which form part thereof.

My invention has reference to grain-binders in general, but more particularly to what are known as "cord-knotters;" and it consists in the arrangement of two pairs of jaws adapted to reciprocate, one of which has the loop formed upon itself, and the other of which advances and seizes the cord, and after it has been severed by the knife draws the free ends over and across the loop lying on the looper and into the jaws of the looper, and combining with the above-described pairs of jaws a holder for the cord and a cutter to sever the cord after the pair of nipper-jaws has closed upon the ends; further, in combining with the above a binder-arm and a clamp arranged between the bundle and knotter to clamp and hold the cords to prevent any undue tension being put upon the cord ends during the act of tying the knot; further, in a binder-arm having a jointed end, which is adapted to enter the grain in a perpendicular line and afterward double under to pass the binding-cord into the cord-holder; further, in an improvement in tension devices for the binding-cord, by which an increased tension is put upon the cord when the cord has been almost passed around the gavel, and before the knot is tied, combined with means to draw the two ends of the loop formed by the cord passing around the gavel and clamp them, and in many details of construction, all of which are more fully set forth hereinafter.

The object of my invention is to provide binding mechanism in which the loop is formed by the reciprocation of parts, and practically without rotary motion, thereby simplifying the construction of the knotting mechanism and making it more durable and less liable to get out of order; also, to provide a tension device which shall allow easy supply of the cord during the act of passing it around the bundle, but which puts it under increased tension before the loop is formed, to prevent loose binding, and attain other results, which will be fully explained hereinafter.

Figure 15:
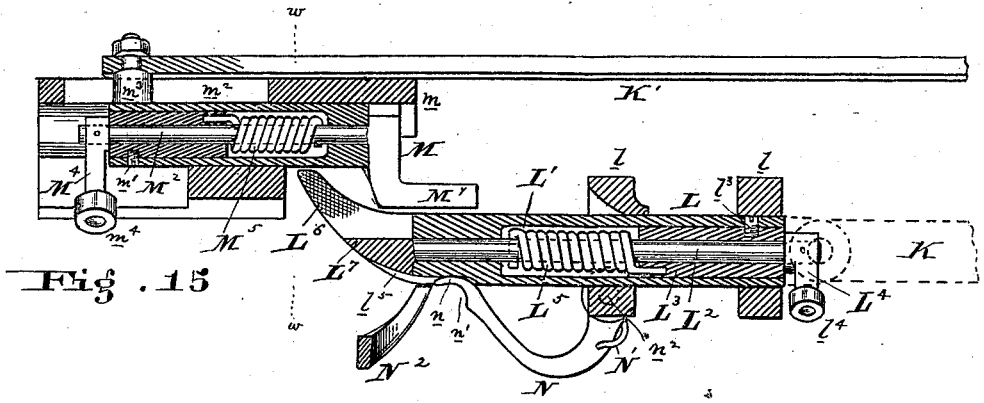
Figure 16:
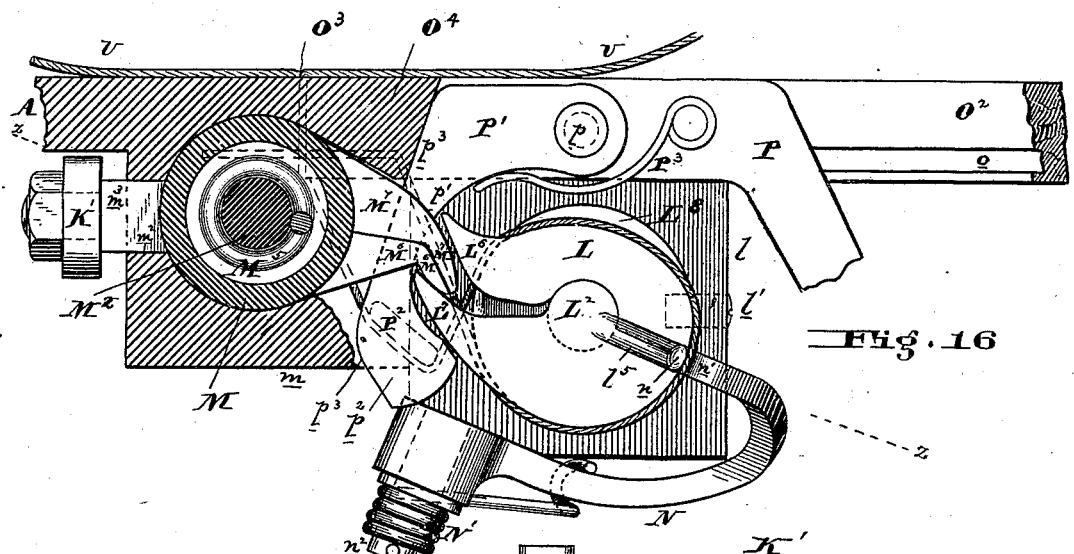
Figure 24:
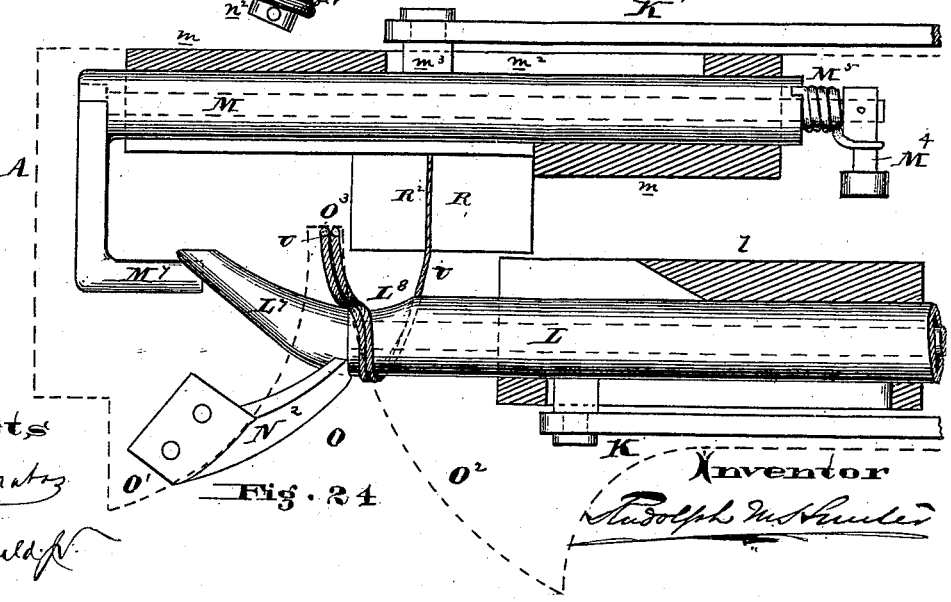
Figure 17:
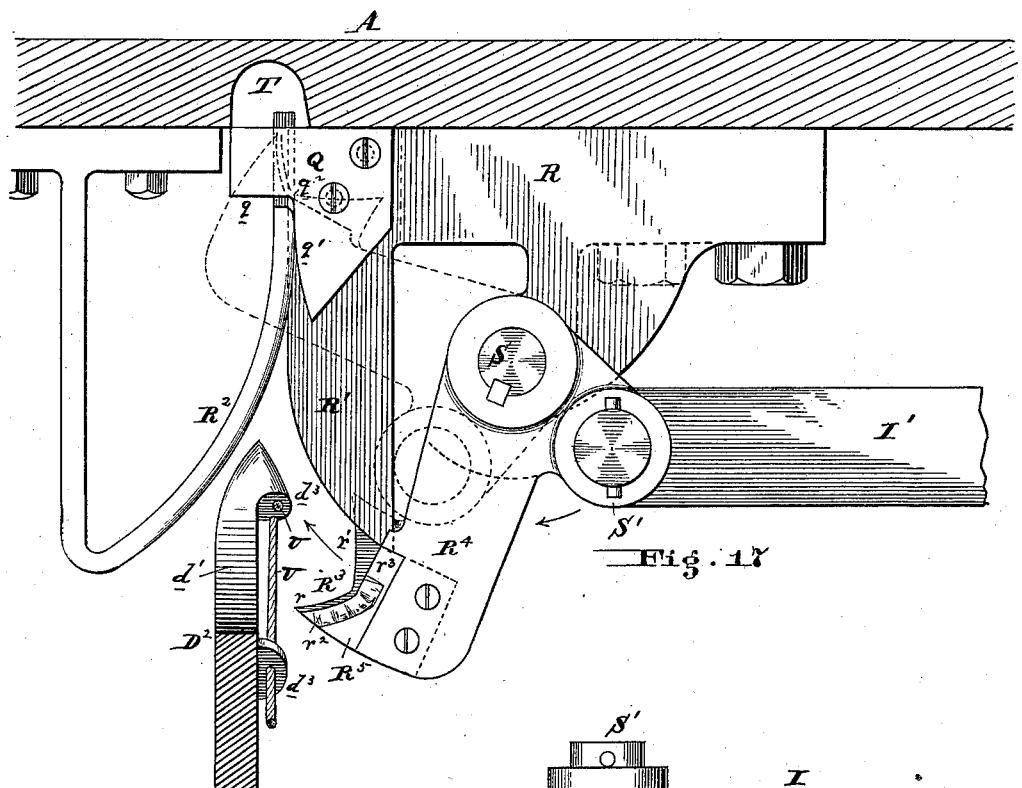
Figure 18:
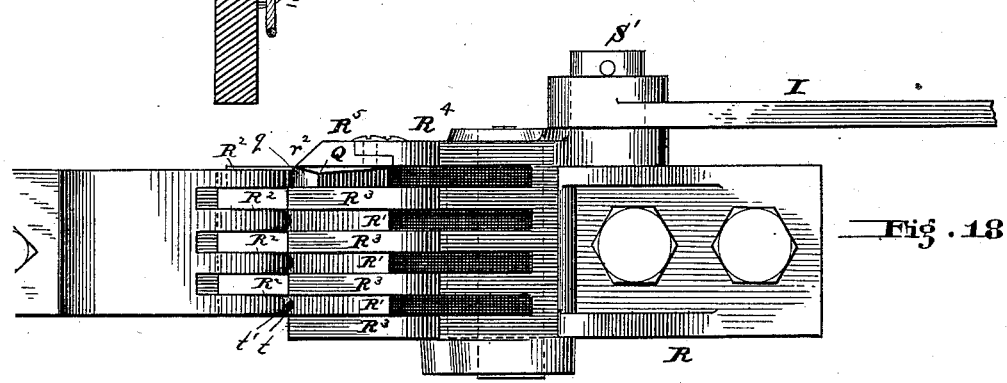
Figure 19:
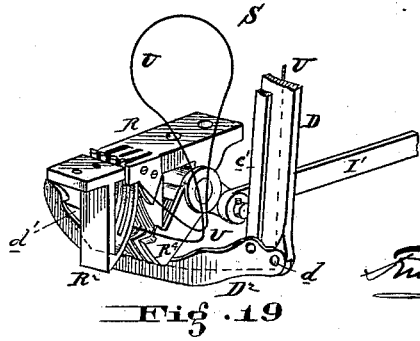
Figure 20:
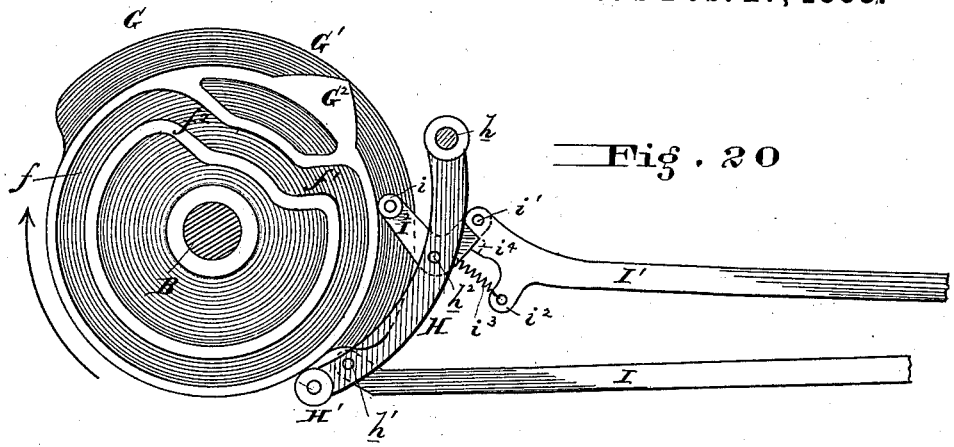
Figures 22, 23:
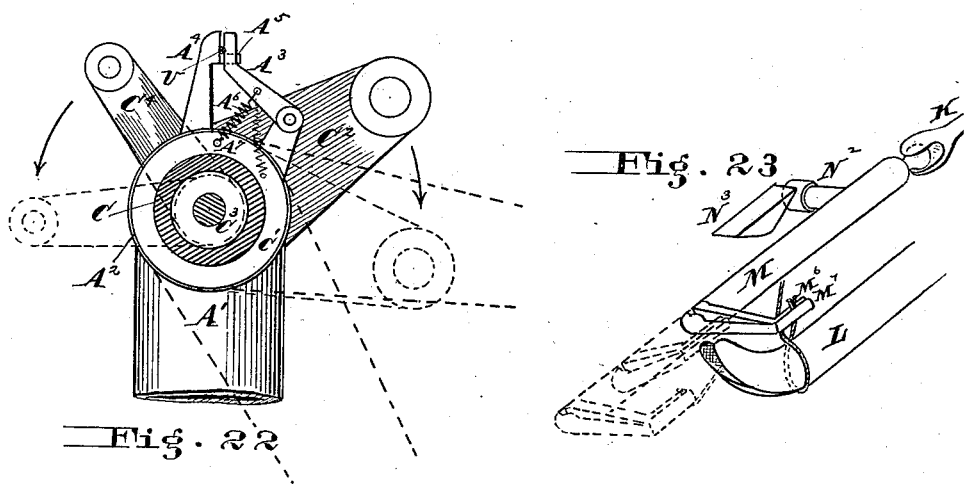
Figure 21:
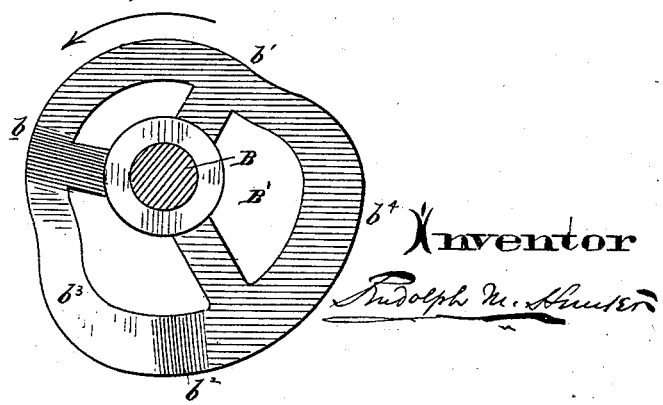

In the drawings, Figure 1 is a perspective view of the binding mechanism of a grain-binder embodying my improvements. Fig. 2 is an elevation of same, with the binder-arm and its supporting mechanism removed. Fig. 3 is a plan of same, with the frame A and all above removed. Figs. 4 to 12 are detail perspective views, and show the gradual formation of the knot. Fig. 13 is a section of part of the looping and clamping devices on line $y\ y$ of Fig. 14. Fig. 14 is a cross-section of same on line $x\ x$ of Fig. 13. Fig. 15 is an oblique sectional elevation of the looping mechanism on line $z\ z$ of Fig. 16. Fig. 16 is a cross-section of same enlarged, and showing the cord-clamp on line $w\ w$ of Fig. 15. Fig. 17 is a side elevation of the cord-holder and its knife. Fig. 18 is a plan view of same, looking upward. Fig. 19 is a perspective view of same and a part of the binder-arm, showing how the cords are fed to the holder. Fig. 20 is a plan view, looking upward, of the cams adapted to actuate the jaws which place the ends of the cord in the looping jaws; also the cord-clamp and cord-holder. Fig. 21 is a plan view of the cam which actuates the binder-arm, tension device, and the binder-mechanism-supporting frame. Fig. 22 is a cross-section, on line $v\ v$ of Fig. 1, of the binder-arm shaft, and shows the tension device for the cord in elevation. Fig. 23 is a perspective view of a modified arrangement of the looping devices; and Fig. 24 is a plan view of another modification of the looping mechanism, showing the bodies of the two pairs of jaws parallel to each other and on each side of the cord-holder to shorten the binder-frame.

A is the binder-mechanism-supporting frame, pivoted at one end upon the vertical shaft B, which may be rotated by a shaft, F, through the mediation of the bevel-wheels F' F². The upright post or standard A', secured to the binder-mechanism-supporting frame, carries at its top the bearing A², in which the horizontal hollow binder-arm shaft C is journaled and kept from end movement by collar C' and crank C². If desired, this binder-arm shaft may be arranged obliquely vertically to the horizontal binder-mechanism-supporting frame. To the end of the binder-arm shaft is secured the jointed binder-arm D, which consists of the part D′, secured firmly to the binder-arm shaft, and the hinged part D², which is hinged to part D′ at $d$, is curved on one edge, as at $d'$, to allow the cord-clamp to secure the cords, and carries in its point the cord-guide $d^3$. Pivoted to part D², at $d^2$, is the rod $c'$, which is reciprocated by an eccentric or crank, $c$, secured upon the end of the shaft C³, which is carried within the hollow binder-shaft C, and is provided on its other end with a crank, C⁴.

The tension device is constructed as follows: Secured to the bearing A², or other stationary part of the machine, is a clamping-jaw, A⁴, provided with supporting-prongs A⁵, over which the cord U is drawn. Working against this jaw A⁴ is a hinged arm, A³, having a perforated clamping-jaw to correspond with the jaw A⁴, and attached to said arm is one end of a spring, A⁶, the other end of which is secured to the collar C′, which is fast to the binder-arm shaft, or directly to the binder-shaft C, so as to keep the jaws closed. When the binder-arm rocks to encircle the gavel the spring is gradually eased, and then when the gavel is nearly encircled gradually put under increased tension. It changes its position, as shown by dotted lines in Fig. 22. I do not confine myself to any particular construction, as my invention comprehends broadly any mechanism which is adapted to relieve the tension of the binding-cord when the binder-arm starts to encircle the gavel, and then put it under increased tension as the binder-arm completes the encircling of the bundle with the band.

Pivoted to the crank C² on the binder-shaft is the rod E, guided at the bottom by a pivoted guide-box, E′, which is pivoted on a stud secured to the frame A, and upon which it rocks to allow for the movement of the crank C², and said rod is provided on the bottom with an anti-friction cam-roller, $e^2$, pivoted to an arm on the hub E⁵, the said roller working against the face of a cam, B. Encircling the rod E, and resting upon the guide-box E′, is a spring, E², and immediately above said spring is a loose collar, E³, to which is connected a rod, E⁴, pivoted at its upper end to the crank C⁴ on the shaft C³, which actuates the jointed end of the binder-arm. A stop, $e'$, prevents the collar E³ being moved up too far by the spring.

Secured firmly to the rod E, and a short distance above the loose collar E³, is the collar $e$.

The cam-wheel B′ is secured to the vertical shaft B, and is provided with the upper and lower lateral faces, $b^3$ $b'$, and peripheral cam-surfaces $b$, $b^2$, and $b^4$. Of these, through the agency of the intervening mechanism set forth above, the face $b^3$ holds the binder-arm out of the grain, the cam part $b$ forces it down through the grain, the lower face, $b'$, holds it down while the knot is being tied, the peripheral cam-surface $b^2$ raises the binder-arm out of the grain by acting upon roller $e^2$ and rod E, and the peripheral cam-surface is designed to rock the arm B², and which, by means of bar B³ and pin B⁴, oscillates the binder-mechanism-supporting frame to cause it to advance and take a gavel, bind it in moving back, and finally discharge the bound bundle, as is common in nearly all of this class of grain-binding machines. A spring, B⁵, may be used to keep the arm B² against the cam. If desired, there may be two separate cams, or the binder frame may be oscillated by any of the well-known devices now in use.

When this binding mechanism is used upon what are known as the "Marsh harvesters" the binder-mechanism-supporting frame is made to oscillate, the cams rotating; but when used upon machines having rotating platforms the binder-mechanism-supporting frame is made to rotate and the cams may remain stationary.

Located above the cam-wheel B′, and secured to the shaft B, is the double-faced cam-groove wheel G, provided on the upper surface with a cam-groove, $g$, which actuates the looping-jaws by means of a roller, $k$, and rod K, the latter two being guided by guides $k^2$ on the under side of the binder-mechanism-supporting frame A, and on its lower face with a cam-groove, $f$, which actuates the nipper-jaws by means of roller $k'$ and rod K′, which are also guided by guide $k^3$, secured also to the binder-mechanism-supporting frame. The cam-groove $g$ is clearly shown in Fig. 3, and cam-groove $f$ is clearly shown in Fig. 20, the former of which has one irregular part, $g'$, and the latter two irregular parts, $f'$ $f^2$. The parts $g'$ and $f^2$ are disposed in position to each other as shown in Fig. 3, for the purpose of causing the looper-jaws to move in one direction and the nipper-jaws in the other direction, during which action the latter place the free ends of the cord into the looper-jaws.

L represents the pair of looper-jaws, and M the pair of nipper-jaws. They are arranged substantially parallel to each other, and so that they shall move in nearly the same line. In all of the drawings, except Fig. 23, the nipper-jaws are designed to pass between the looper-jaws, which are always open, except when completing the knot, and in Fig. 23 the nipper-jaws are arranged to pass up over the looper-jaws, drawing the free ends of the cord first over and then down into the looper-jaws, which close upon them, as shown in dotted lines, this auxiliary movement to the nipper-jaws being given by a cam, N³, on the frame, and roller N², secured to the body of said nipper-jaws. The looper and nipper jaws may be constructed substantially alike. In describing one I describe the other, the letters L and M referring to the respective parts.

The body of the looper is made hollow, as at L′, and carries at one end the fixed jaw L⁶. Journaled in the body is a rod or shaft, L², carrying on one end the movable jaw L⁷ and on the other end a crank-arm, L⁴, provided with an anti-friction roller, $l^4$. A spring, L⁵, encircles the shaft L², and one end of it is secured thereto, and the other is made fast to a plug, L³, placed in the end of the looper and forming part of the bearing for the shaft L². This plug L³ is kept from turning by a set-screw, l³. The spring L⁵ keeps the jaws L⁶ L⁷ pressed together when the roller l⁴ is free from the actuating-cams l⁶ and l⁷ on the frame. The looper slides in bearings l, and is prevented from turning by a groove, l², and pin l', or other equivalent means. When in the position shown in Fig. 2 the cam part l⁶ causes the jaws to remain open; but as the looper is drawn back the roller leaves the cam part l⁶ and the jaws suddenly close, and as they continue their backward movement they are at the last moment very slightly opened to free the ends of the cord to allow the bundle to be easily discharged. This last opening is accomplished by cam part l⁷.

The general construction of the nipper-jaws M is the same as that just described; but in this case the body is shown as guided by its operating-stud $m^3$, sliding in a slot, $m^2$, in the frame, and the jaws M⁶ and M⁷—the former of which is fixed and the latter movable—are closed all the time, except when about to seize the cords next to the holder. Therefore the spring M⁵ keeps them closed until the roller $m^4$ strikes the pivoted cam $m^5$, pivoted to the binder-mechanism-supporting frame at $m^6$, and pressed against a stop-pin, $m^8$, by a spring, $m^7$. As the nipper-jaws are moved toward the looper, and as they are about to seize the cords held in the holder, the roller $m^4$ strikes the under side of the cam $m^5$ and quickly opens the jaws M⁶ M⁷, the cords passing between them. The roller then passes the cam and the cords are clamped, and after the knife severs them the nipper-jaws are drawn back; but now the roller passes over and presses down the cam $m^5$ and does not open the jaws.

The looper L is provided with a groove, $l^5$, running in a line with the clamping-faces of the jaws, and in this groove the point $n$ of the end of spring-finger N is made to lie by spring N', which keeps it in contact with the looper as the latter moves before it. This spring-finger is pivoted to the frame at $n^2$, and above the point $n$ of the same is a curved part, $n'$, over which and the point $n$ the loop is formed and knot tied, as more clearly set forth hereinafter.

Above the looper and nipper-jaws, and forming part of the binder-mechanism-supporting frame, is the slot O, which extends a short distance beyond the vertical plane, extending longitudinally through the looper-body, and ends in a clamping-face, O³. The sides of this slot are curved, as shown at O' O², and upon the latter, as a guide, the clamp-lever P works. Its head is prevented from displacement vertically by a groove and feather, $o$, and carries pivoted thereto, at $p$, the cord-bending arm P', provided upon one edge with a cam-face, $p^3$, which works with the cam O⁴ in slot O to depress the said arm to the position shown in Figs. 14 and 16, and on its under edge it is curved in, as shown at $p'$, to allow the looping-jaws to freely pass. Near its bottom or end it is provided with a stud or projection, P², under which the cords are held when the knot is being tied, and when the cords are clamped between the clamp-lever P and face O³. The part $p^2$ prevents the cords which are bent about the looper being drawn into the jaws of same. When the arm P' is relieved from the action of the cam O⁴ the spring P³ causes it to be raised clear of the looper, the projection P² fitting upon the end of the clamping-face of lever P. This clamping-lever P is pivoted to the binder-mechanism-supporting frame at $p^4$, and is pressed out of clamping position by a spring, P⁴, when relieved from the action of peripheral cam G', by which it is made to clamp, through the mediation of lever H, pivoted to the binder-mechanism-supporting frame at $h$, and carrying on its end an anti-friction roller, H', and bar or rod I, hinged to said lever H at $h'$. The cam G' is formed upon the periphery of the cam G, secured to the shaft B, previously described.

A cord-guide, N², may be secured to the under side of the binder-mechanism-supporting frame and curve down to the looper to prevent the cords passing over the jaws while being bent about the body of same, as shown in Figs. 15 and 24, and the upper part of the looper, close to the jaws, may be cut down, as shown at L⁸ in Fig. 24, to allow the nipper-jaws to more easily pass above the cords, which by this means are brought lower down when acted on by the cord-bending arm P'.

The jaws L⁶ L⁷ of the looper, as well as the jaws M⁶ M⁷ of the nippers, may be made straight, or curved, as shown in Fig. 16, which latter construction allows of a more compact arrangement of parts.

The cord-holder is constructed as follows: The part R is provided in front with the curved depending fingers R', between which the gathering-fingers R³ and knife R⁴ work, they being secured to a common hub provided with the crank S', and journaled at S to the part R, which is secured firmly to the binder-mechanism-supporting frame, close to the looper, and a little to one side of the clamp-face O³. The gathering-fingers R³ are provided with the two curved edges $r$ and $r'$, the former of which catch the cords U, and as they are pressed into the clamp or holder they move toward the edge $r'$, and this forces them up between the solid or rigid fingers R' and the spring-fingers R², which press against them, without any tendency to cut or bind upon the cord, since when the cords enter between the fingers R' R² the edge $r'$ is pressing up, and its edge is substantially at right angles to the line of contact of the fingers R' and R². The knife or cutter is provided with a removable blade, R⁵, provided with the curved cutting-edge $r^2$ and the straight part $r^3$, part of which only is made sharp, so as to have the part corresponding to the juncture of curved part $r^2$ and straight part $r^3$ made sharp. The cutting-edge of the knife is a little in the rear of the gathering-edges of the fingers $R^3$, so as to prevent any possibility of prematurely cutting the cords, and also to insure the cords being put under tension by being drawn over the cutting-block Q, secured to the part R or binder-mechanism-supporting frame. This block Q is provided with horizontal edge $q$ and a curved edge, $q'$, against which latter one of the spring-fingers $R^2$ shorter than the rest is arranged to press, as shown in Figs. 17 and 18. When the knife ascends the cords are gathered in the corner $q^2$ by the various parts, as shown in dotted lines, and severed. The spring-fingers $R^2$ correspond with the rigid fingers $R'$, their edges pressing together for considerable length, the former being rounded, as at $t'$, and the latter concave or grooved, as at $t$, or vice versa; but this is not necessary. The spring-fingers are bolted by means of their curved support to the binder-mechanism-supporting frame. The waste ends of cord pass out from between fingers $R'$ and $R^2$ into the groove T in the frame and escape as fresh cords are pressed in. The relative position of the binder-arm to the cord-holder when the cords are passed around the gavel is shown in Figs. 17 and 19. The gathering-fingers and knife are operated by the bar $I'$, pivoted to crank $S'$, and receives two distinct motions—viz, one to clamp and one to sever the cords.

Pivoted to the lever H, at $h^2$, is a bell-crank, $I^2$, carrying on one end an anti-friction roller, $i$, the other end of which is pivoted at $i'$ to the bar $I'$, the end of which is curved, so that the line of thrust is through the pivot $h^2$ of the bell-crank $I^2$. The bar $I'$ is provided with a stop, $i^4$, which brings the bell-crank at rest when its arm is at an angle to the line of thrust on bar $I'$, and they are normally kept in such relative position by a spring, $i^3$. The periphery of the cam-wheel G is provided with a small cam, $G^2$, adapted to strike the roller $i$ and oscillate the bell-crank $I^2$ to increase the movement of the bar $I'$ for the purpose of actuating the knife $R^4$ for giving the second movement to the clamp and knife at the proper time to sever the cords. If desired, the cam $G^2$ may continue to the end of cam $G'$, as it is not necessary to withdraw the knife from the stationary cutting-edge immediately after severing the cords.

The operation is as follows: The gavel having been laid, the cam-surface $b$, through the agency of mechanism previously specified, causes the binder-arm to descend, and after the point of same has passed through the grain the collar $e$ actuates the eccentric $c$, causing the hinged or jointed end $D^2$ of the binder-arm to turn up, as shown in Figs. 17 and 19, and pass the cord between the fingers $R'$ $R^2$, and within reach of the gathering-fingers $R^3$. It being supposed that the end of the cord is held in the cord-clamp, we will now find the cord to extend from holder, under looper, around gavel, again under the looper, as shown in Fig. 4, and to end of binder-arm. Now, as the cam-wheel G is rotated the peripheral cam $G'$ moves the lever $H'$ and gathers in the cords into the holder. This is shown in Fig. 4, and at the same time the cord-clamp lever P clamps the cords between the gavel and looper, and the arm $P'$ is thrust down by the cam $O^4$, bending the cords partly around the looper. This is shown in Fig. 5. Now the part $f'$ of the cam-groove $f$ draws in the nipper-jaws M, and the closed jaws $M^6$ $M^7$ pass over the cords extending from the clamp to the looper, as shown in Fig. 6. As they still advance the cam $m^5$ causes the jaws to open and pass on either side of the cords held in the cord-holder, and extending thence to the looper, as shown in Fig. 7. The cam $m^5$ is then passed and the jaws clamp the cords, and at this instant the cam $G^2$ oscillates the bell-crank $I^2$, causing the knife $R^4$ to sever the cords, and the parts are as shown in Fig. 8. Now the part $g'$ of the cam-groove $g$ draws the looper-jaws back and the part $f^2$ of the groove $f$ moves the nipper-jaws forward, the latter preferably moving most rapidly and drawing the free ends of the cord (the knife having operated to cut the cords, as previously set forth) over the part held down by the projection $P^2$ on arm $P'$, and between the looper-jaws, as shown in Fig. 13, and as the looper moves back the finger N, lying in the groove on the jaws, is struck by the loop and slides it up on the jaws, as shown in Fig. 9, the curved looper acting as a cam to control the movement of the stripper-finger N. As this motion is continued the roller $l^4$ runs off cam $l^6$ and the jaws $L^6$ $L^7$ close upon the free ends of the cord, as shown in Fig. 10. Now the jaws of the looper and those of the nippers are pulling in opposite direction, and the cord ends are drawn out of the nipper-jaws, or they may be slightly opened by a cam, $m^9$, and as the looper still moves back the finger N pushes the loop over the jaws and off the same, the free ends being drawn through the loop, which is now held upon the prong $n$ of the finger N, as shown in Fig. 11. As the looper is still moved back the spring projects the finger and the knot is tightened, and then the cam part $l^7$ causes the looper-jaws to be slightly opened, but not until the clamping-lever P has been drawn back and the knot pushed up close to the bundle by the finger N, upon which it is tied. The bundle is now freed and the binder-arm is caused to ascend, but not until after the looper L has returned to its original place. During the operation just described the binder-mechanism-supporting frame is either oscillated or rotated, as the case may be, according as to what class of machine it is used upon, in the former case the cams being rotated and in the latter remaining stationary. As the binder-arm is descending the cord is drawn from box $A^3$ under gradually-decreasing tension, and toward the completion of the movement of the binder-arm the tension is increased and is greatest. The effect of this is first to prevent spreading of the grain by drawing it up into a round gavel, then to give easy supply of cord to encircle the gavel, next, to give increased tension as the bundle is encircled, and, finally, to give much increased tension to tighten up the gavel, the additional tightening effect being accomplished by clamping-lever P. The increased tension is given before the tying of the knot begins.

I do not limit myself to particular constructions shown, as they may be modified in various ways. Neither is it necessary to my invention that the nipper-jaws pass between the looper-jaws, as the nippers may be made to move over the loopers and yet accomplish the same result, as shown in Fig. 23.

I am aware that it is not new to use a reciprocating looper combined with means for wrapping the cord around the looper, and a reciprocating device for placing the cord in the jaws of the looper—as, for instance, in Hull, 190,041, April 24, 1877; but in this construction the device for placing the cord in the looper-jaws does not advance and seize the cord and draw it into the looper-jaws; but the binder-arm lays the cord into this device, which then carries the cord to the looper-jaws. This further differs from mine, in that the applied band is not severed from the spool portion until after the cord has been carried to and seized by the looper-jaws. In other words, the cut or free ends of the cord are not carried into the looper-jaws.

I am also aware that it is not new to use a reciprocating device upon which the loop is formed, combined with means to wrap the cord around the same, and a pair of reciprocating jaws which passes between the prongs of the first-named device and seizes the cord, and after the applied band is severed from the spool portion draws the cut ends through the loop—as, for instance, in Keller, 200,544, February 19, 1878; but in this construction the device upon which the loop is formed has rigid prongs, instead of clamping-jaws, and cannot therefore hold the ends while the loop is pushed off and the knot tightened, as mine does.

Having now described my invention, what I claim as new, and desire to secure by Letters Patent, is—

1. In a cord-knotter, two pairs of reciprocating jaws, upon one of which the loop is formed, and the other of which advances and seizes the cord, and after it has been cut draws the free ends thereof over into the looper-jaws, in combination with operating mechanism, and means to cut the binding-cord immediately after the nipper-jaws have seized said cord, and before they have carried the ends into the looper-jaws.

2. In a cord-knotter, a pair of reciprocating looper-jaws, in combination with means to pass the binding-cord around said looper-jaws, a pair of reciprocating nipper-jaws which advances and seizes the cord, and after it has been cut draws the free ends thereof into the looper-jaws, where they are clamped, and means to cut the binding-cord close to the nipper-jaws immediately after said jaws have seized said cord, and before they have carried the ends into the looper-jaws.

3. In a cord-knotter, a pair of reciprocating looper-jaws, in combination with means to pass the binding-cord around said looper-jaws, a pair of reciprocating nipper-jaws which advances and seizes the cord, and after it has been cut draws the free ends thereof into the looper-jaws, means to cut the binding-cord close to the nipper-jaws immediately after said jaws have seized said cord, and before they have carried the ends into the looper-jaws, and means to push the loop over the ends of the cord and off the looping-jaws.

4. In a cord-knotter, a pair of reciprocating looper-jaws upon which the loop is formed, in combination with a pair of reciprocating nipper-jaws which advances and seizes the cord, and after it has been cut draws the free ends thereof over the loop formed on the looper-jaws, and delivers it into said looper-jaws, by which it is clamped, a cord-holder and knife arranged on one side of the looper-jaws, a cord-clamp arranged between the looper and gavel, and a binder-arm adapted to pass the cord around the gavel and into the cord-holder, the said knife being adapted to sever the binding-cord immediately after it has been seized by the nipper-jaws, and before they have carried the ends into the looper-jaws.

5. In a cord-knotter, a reciprocating looper provided on its end with a pair of curved jaws, and around which the cord is passed, in combination with means to bend the cord around said looper to form the loop, a pair of reciprocating nipper-jaws, arranged to reciprocate between the open looper-jaws, which advances and seizes the cord, and after it has been cut draws the ends thereof over the loop formed on the looper and into the looper-jaws, by which said ends are clamped and held, and devices to cause said ends to be drawn through the loop.

6. In a grain-binder, a jointed binder-arm which enters the grain on a line substantially perpendicular to it, in combination with mechanism to oscillate said binder-arm, a cam or eccentric arranged in line with the shaft of the binder-arm, a rod connecting said eccentric with the jointed end of the binder-arm, and means to rotate said eccentric to turn the jointed end up toward the binding-shaft, after it has passed below the binding platform or table, for the purpose of passing the cord into the cord-holder.

7. In a cord-knotter, a tension device for the binding-cord, consisting of two clamping-jaws, between which the cord passes, and means to increase the clamping-pressure between said jaws as the binding-arm is completing the operation of passing the cord around the gavel, and before the knot is begun to be tied, in combination with said binding-arm and its operating mechanism, and means to draw the cord ends formed by the loop around the gavel together and firmly clamp them.

8. In a cord-knotter, a tension device for the binding-cord, adapted to relieve the tension of the cord as the binder-arm enters the grain and increase the tension on the binding-cord while the binding-arm is completing the operation of passing the cord around the gavel and into the knot-tying mechanism, and before the knot is begun to be tied or cord clamped between the bundle and looper, in combination with means to draw the two ends of the loop formed by the binding-cord around the bundle together and clamp them.

9. In a grain-binder, a cord-clamp arranged between the knot-tying mechanism and gavel, and provided with a hinged arm to bend or force the cords down around the looper of the knot-tying mechanism, said cord-bending mechanism operating just before the cords are firmly clamped.

10. In a grain-binder, a looper and means to clamp the binding-cords between the looper and gavel, in combination with hinged mechanism to force or bend said binding-cord between said clamp and looper down around said looper, nipper-jaws which pass over the bend in the said binding-cord, and a cam to operate said hinged mechanism.

11. In a cord-knotter, a reciprocating looper, upon which the loop is formed, in combination with a finger, upon the end of which the knot is formed and tightened, a spring to press said finger at all times against the looper, the movements of said finger to and from the gavel being controlled wholly by the reciprocation of said looper.

12. In a cord-knotter, a reciprocating looper, which consists of a cylindrical body provided on its end with a pair of curved jaws, in combination with a finger pressed against said looper by a spring, and around which the loop is formed and knot tied, the said finger being adapted to push said loop off said looper, the movements of said finger being actuated by the body and curved jaws of the looper, which perform the function of a cam.

13. In a cord-knotter, a reciprocating looper having its surface curved to form a cam, in combination with a spring, and a finger pressed against said looper by said spring, and upon the end of which the knot is tightened, the said finger moving to and from the gavel and having its movement controlled wholly by the cam-face of said looper.

14. In a cord-knotter, a pair of reciprocating looper-jaws, upon which the loop is formed, and a pair of nipper-jaws which advances and seizes the cord, and after it has been cut draws the free ends thereof over the loop on the looper-jaws and into the said looper-jaws, in combination with means to cut the binding-cord close to the nipper-jaws immediately after said jaws have seized said cord, and before they have carried the ends into the looper-jaws, and a jointed binder-arm arranged to pass the cord around the looper-jaws and into the cord-holder.

15. In a cord-knotter, a pair of reciprocating looper-jaws, upon which the loop is formed, and a pair of nipper-jaws which advances and seizes the cord, and after it has been cut draws the free ends thereof over the loop on the looper-jaws and into said jaws, where they are clamped, in combination with means to cut the binding-cord close to the nipper-jaws immediately after said jaws have seized said cord, and before they have carried the ends into the looper-jaws, a cord-clamp arranged between the gavel and looper, a stationary cord-holder arranged to one side of the knife, and a binder-arm to pass the cord under the looper and into the cord-holder.

16. In a cord-knotter, a pair of reciprocating looper-jaws, upon which the loop is formed, and a pair of nipper-jaws which advances and seizes the cord, and after it has been cut draws the free ends thereof over the loop on the looper and into the looper-jaws, where they are clamped, in combination with means to reciprocate said jaws, means to cut the binding-cord close to the nipper-jaws immediately after said jaws have seized said cord, and before they have carried the ends into the looper-jaws, a cord-clamp arranged between the gavel and looper, a stationary cord-holder arranged to one side of the knife, a finger upon which the knot is tied and tightened, and a binder-arm to pass the cord around the gavel and into the cord-holder.

17. In a cord-knotter, a pair of reciprocating looper-jaws, upon which the loop is formed, and a pair of nipper-jaws which advances and seizes the cord, and after it has been cut draws the free ends thereof over the loop on the looper and into the looper-jaws, where they are clamped, in combination with a cord-clamp to clamp the binding-cord between the gavel and looper, and means to bend or force the cords around the looper to complete the loop.

18. In a cord-knotter, the combination of the looper L, provided with jaws $L^6$ $L^7$, the nipper M, provided with jaws $M^6$ $M^7$, and means to reciprocate both sets of jaws, the cranks $L^4$ $M^4$, provided on their ends with anti-friction rollers $l^4$ $m^4$, and the cams to actuate said cranks to open both the nipper and the looper jaws.

19. In a cord-knotter, the combination of the looper L, provided with jaws $L^6$ $L^7$, the nipper-jaws $M^6$ $M^7$, and means to reciprocate them, the cranks $L^4 M^4$, provided on their ends with anti-friction rollers, and the cams $m^5$ and $l^6$, the former of which acts to open the nipper-jaws when moving in one direction only, and the latter acting in the same manner upon the looper-jaws.

20. In a cord-knotter, the looper-jaws, consisting of hollow body L, carrying fixed jaw $L^6$, in combination with shaft $L^2$, carrying on one end the movable jaw $L^7$ and on the other the crank $L^4$, spring $L^5$, and plug $L^3$, substantially as shown.

21. In a cord-knotter, a pair of looping-jaws, upon which the loop is formed, in combination with a pair of nipping-jaws which draws the cut ends of the binding-cord into the looping-jaws, and by which said ends are clamped, rods or bars K K', and a cam-wheel provided with grooves $g$ $g'$ and $f$ $f'$ $f^2$, substantially as and for the purpose specified.

22. In a cord-knotter, the binder-mechanism-supporting frame A, provided with the curved guides O' $O^2$ and clamping-face $O^3$ and cam $O^4$, in combination with the clamping-lever P, provided on its clamping end with the hinged cord-bending arm P', having projection $P^2$ and spring $P^3$, substantially as shown.

23. In a cord-knotter, the binder-mechanism-supporting frame A, provided with slot O and clamping-face $O^3$ and cam $O^4$, in combination with clamping-lever P, provided on its clamping end with hinged cord-bending arm P', having projection $P^2$, spring $P^3$, spring $P^4$, arm H, and cam G', substantially as set forth.

24. In a cord-knotter, the looper having curved jaws $L^6$ $L^7$, which act as cams upon the stripping and tightening finger, provided with groove $l^5$, in combination with means to reciprocate said jaws, the finger N, having prong $n$, which lies in said groove, and spring N', substantially as set forth.

25. In a cord-knotter, the combination of a looper having curved jaws which act as cams upon the stripping and tightening finger, with a pivoted finger, N, having prong $n$ and depression or curved part $n'$, and spring N' to press the prong against the looper.

26. In a cord-knotter, a looper combined with a clamp-lever, P, provided on its clamping end with a pivoted cord-bending arm, P', having projection $P^2$ and extension $p^2$, and spring $P^3$, substantially as shown and described.

27. In a cord-knotter, a binder-frame provided with a guide-slot, O, in combination with a reciprocating looper adapted to reciprocate horizontally in the direction of its length and without rotary motion, and a guide-piece, $N^2$, secured to said binder-frame and extending down to the looper-body, and adapted to prevent the cords prematurely passing over the end of the looper during its reciprocation, substantially as shown.

28. In a cord-knotter, the cord-holder consisting of rigid fingers R', spring-fingers $R^2$, pressing against said rigid fingers, and cutter-block Q, in combination with pivoted gathering-fingers $R^3$ and knife $R^4$, substantially as and for the purpose specified.

29. In a cord-knotter, the combination of rigid curved fingers R', curved spring-fingers $R^2$, said fingers resting against rigid fingers, and a set of gathering-fingers arranged to pass in between the said fingers R' $R^2$ to force the cords between them.

30. In a cord-knotter, the combination of rigid fingers R', spring-fingers $R^2$, and pivoted gathering-fingers $R^3$, having their gathering ends made of curves $r$ and $r'$, as shown, and for the purpose specified.

31. In a grain-binder, the cutter-block Q, having straight edge $q$ and curved edge $q'$, in combination with the pivoted knife $R^4$, having cutting-edge $r^2$ and flat edge $r^3$, substantially as shown.

32. In a grain-binder, the combination of rigid fingers R', spring-fingers $R^2$, pivoted gathering-fingers $R^3$, having their gathering ends made of curves $r$ and $r'$, cutter-block Q, having edge $q$ and curved edge $q'$, and pivoted knife $R^4$, having removable blade $R^5$, provided with curved cutting-edge $r^2$ and flat edge $r^3$, substantially as shown.

33. In a cord-knotter, the combination of a cord-clamp between the gavel and looper, and a cord-holder with bars I and I', bell-crank $I^2$, lever H, and cams G' and $G^2$.

34. In a cord-knotter, a cord-holder, in combination with bar I', having stop $i^4$, bell-crank $I^2$, pivoted to lever H, and having one of its arms pivoted to bar I', the stop $i^4$ being arranged in line of movement of said arm and between the two pivots, spring $i^3$, cam G', and cam $G^2$, substantially as and for the purpose specified.

35. In a grain-binder, the hollow binder-arm shaft C, carrying on its end the rigid part D' of the binder-arm, in combination with means to rock said shaft, the shaft $C^3$, provided on its end with a crank or eccentric, $c$, rod $c'$, and pivoted or hinged part $D^2$ of the binder-arm D, substantially as and for the purpose specified.

36. In a grain-binder, the hollow binder-arm shaft C, provided on one end with a crank, $C^2$, and on the other with the rigid part D' of the binder-arm, in combination with shaft $C^3$, provided on one end with crank $C^4$ and on the other with an eccentric, $c$, the bar or rod $c'$, hinged part $D^2$ of the binder-arm, rod E, having rigid collar $e$, or its equivalent, loose collar $E^3$, rod $E^4$, spring $E^2$, stop $e'$, friction-roller $e^2$, and a cam to reciprocate said rod E, substantially as and for the purpose specified.

37. In a grain-binder, a tension device which consists of a rigid clamping-jaw, $A^4$, and pivoted clamping-jaw $A^3$, in combination with a spring, $A^6$, one end of which is connected to said hinged jaw $A^3$ and the other to a rocking or oscillating part, $A^7$, and means to rock said part to vary the tension of the spring automatically and while binding, substantially as and for the purpose specified.

38. In a cord-knotter, two pairs of reciprocating jaws adapted to form the loop and tie the knot, in combination with cranks to actuate the jaws, and cams $m^5$ $l^6$ $l^7$, and means to reciprocate said jaws, substantially as and for the purpose specified.

39. In a cord-knotter, the reciprocating looper L, having jaws upon one end, in combination with a pair of reciprocating nipper-jaws, rigid guide $N^2$, and pivoted finger N, with its spring $N'$, said parts causing the cords to be presented to the looper in the right place.

40. In a cord-knotter, a pair of reciprocating looper-jaws, and means to wrap the cord around said looper, in combination with a pair of reciprocating nipper-jaws which advances and seizes the cord, and after it is cut draws the free ends into the looper-jaws, by which they are clamped, means to reciprocate said looper and nipper jaws without rotating them, and means to draw the cord ends formed by the loop around the gavel together and firmly clamp them.

In testimony of which invention I hereunto set my hand.

RUDOLPH M. HUNTER.

Witnesses:
R. S. CHILD, Jr.,
LOUIS J. MATOS.